US007006714B2

(12) United States Patent
Kasutani

(10) Patent No.: US 7,006,714 B2
(45) Date of Patent: Feb. 28, 2006

(54) IMAGE RETRIEVAL DEVICE, IMAGE RETRIEVAL METHOD AND STORAGE MEDIUM STORING SIMILAR-IMAGE RETRIEVAL PROGRAM

(75) Inventor: Eiji Kasutani, Tokyo (JP)

(73) Assignee: NEC Corporation, Tokyo (JP)

(*) Notice: Subject to any disclaimer, the term of this patent is extended or adjusted under 35 U.S.C. 154(b) by 600 days.

(21) Appl. No.: 09/732,701

(22) Filed: Dec. 11, 2000

(65) Prior Publication Data

US 2001/0041008 A1    Nov. 15, 2001

(30) Foreign Application Priority Data

Dec. 10, 1999    (JP) ................................. 11-351657

(51) Int. Cl.
  *G06K 9/54*    (2006.01)
(52) U.S. Cl. ..................... 382/305; 382/209; 382/251; 707/6
(58) Field of Classification Search ................ 382/305, 382/209, 217, 218; 358/403; 707/6
  See application file for complete search history.

(56) References Cited

U.S. PATENT DOCUMENTS

| 5,555,555 | A | | 9/1996 | Sato et al. |
| 6,192,150 | B1 | * | 2/2001 | Leow et al. ................. 382/190 |
| 6,345,275 | B1 | * | 2/2002 | Lee ................................ 707/6 |
| 6,665,442 | B1 | * | 12/2003 | Sekiguchi et al. ........... 382/224 |
| 6,681,061 | B1 | * | 1/2004 | Agata et al. ................. 382/305 |
| 6,870,965 | B1 | * | 3/2005 | Kim et al. ................... 382/305 |

FOREIGN PATENT DOCUMENTS

| EP | 0626655 A2 | 11/1994 |
| JP | 05347000 A | 12/1993 |
| JP | 8-249349 | 9/1996 |

OTHER PUBLICATIONS

Yue et al. "Texture Image Retrieval by Universal Classification for Wavelet Transform Coefficients." Proc. Int. Conf. on Image Processing, vol. 3, Oct. 26, 1997, pp. 220-223.*
Gonzalez et al. "Digital Image Processing." Addison-Wesley Publishing Company, Inc. 1992, pp. 143-145 and 374-380.*
Article "Estimations of previewed Road Curvatures and Vehicular Motion by a vision-based Data Fusion Scheme" Authors: Jin-Chuan Hsu, Wen-Liang Chen, Ruey-Horng Lin, Edge Chu Yeh; published 1997.
"Image Retrieval System using Compact Color Layout Descriptor" Authors: Eiji Kasutani, Akio Yamada, Mutsumi Ohta; Materials of the $4_{th}$ Image Media Processing Symposium, Japan, Sep. 29, 1999, IMPS99, pp. 89-90.

(Continued)

*Primary Examiner*—Samir Ahmed
*Assistant Examiner*—Charles Kim
(74) *Attorney, Agent, or Firm*—Sughrue Mion, PLLC

(57) ABSTRACT

An image retrieval device and method capable of high speed image retrieval. The image retrieval device has a first coefficient transforming section to transform a first group of image feature descriptors extracted from image data accumulated in an image database and to generate a second group of image feature descriptors to be used for calculating similarity. The image retrieval device has a second coefficient transforming section to transform the first group of image feature descriptors extracted from image data of an inquired image and to generate a second group of image feature descriptors to be used for calculating similarity. The image retrieval device has a similarity calculating section to compare the second group of image feature descriptors for each piece of image data produced by the first coefficient transforming section with the second group of image feature descriptors for the inquired image transformed by the second coefficient transforming section.

20 Claims, 3 Drawing Sheets

OTHER PUBLICATIONS

"Proposal for a High-Speed Searching Scheme Using Information in Compressed Video as a Key" Authors: Eiji Kasutani, Keiji Maeda, Hisashi Miyamori, Hideyoshi Tominaga; Abstracts of the 1997 Annual Meeting of the Institute of Image Information and Television Engineers, Japan, Jul. 23, 1997, No. 15-10, pp. 191-192.

"High Speed Target Searching of MPEG Video Based on Time Series Evaluation of Low Order DCT Coefficients" Authors: Eiji Kasutani, Akio Yamada, Mutsumi Ohta; Proceedings of the 1999 General Meeting of Electronics, Information and Communications Engineers, Japan, Mar. 8, 1999, No. D-12-7, p. 180.

"Format-Independent Scheme for High Speed Searching for Similar Video Segments" Authors: Eiji Kasutani, Akio Yamada, Mutsumi Ohta; Proceedings of the 1999 General Meeting of Electronics, Information and Communications Engineers Systems Society Meeting, Japan, Aug. 16, 1999 No. D-12-6, p. 170.

* cited by examiner

FIG.3
| methods | rate of correctly solved retrieval |
|---|---|
| DCT coefficient itself | 0.738 |
| transformed DCT coefficient | 0.828 |
| decoding of images | 0.813 |
FIG.4 (PRIOR ART)
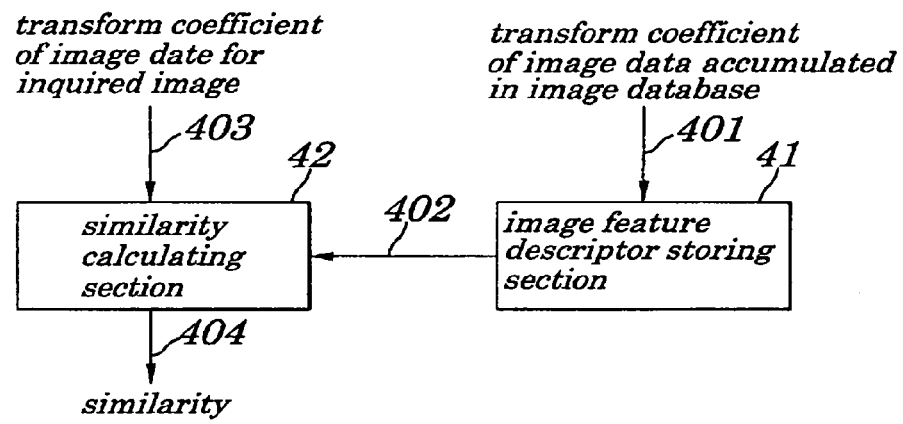
FIG.5 (PRIOR ART)
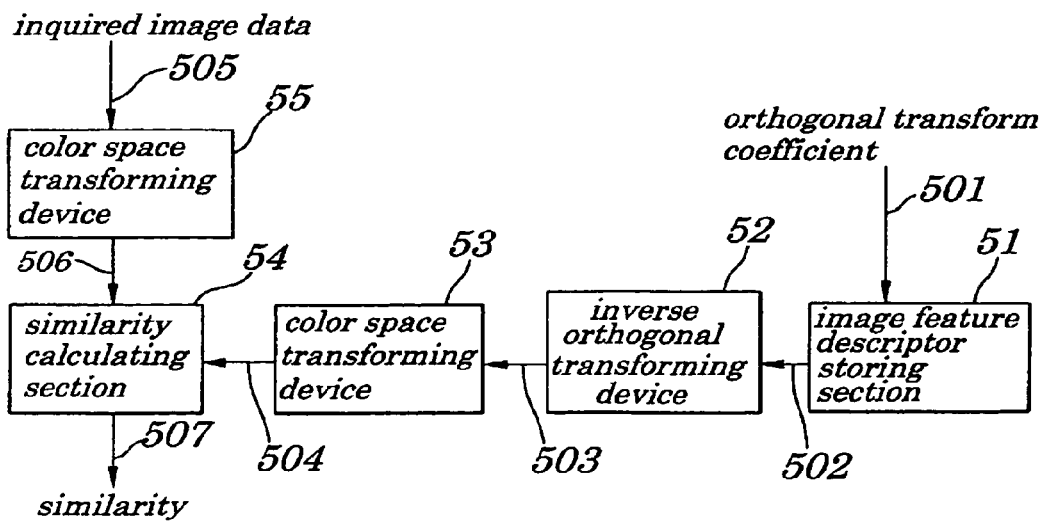

# IMAGE RETRIEVAL DEVICE, IMAGE RETRIEVAL METHOD AND STORAGE MEDIUM STORING SIMILAR-IMAGE RETRIEVAL PROGRAM

BACKGROUND OF THE INVENTION

1. Field of the Invention

The present invention relates to an image retrieval device and an image retrieval method to retrieve an image being similar to an inquired image, from images accumulated in an image database and a storage medium storing an image retrieval program to retrieve, by controlling a computer, an image being similar to an inquired image from images stored in an image database The present application claims priority of Japanese Patent Application No. Hei 11-351657 filed on Dec. 10, 1999, which is hereby incorporated by reference.

2. Description of the Related Art

There are cases where an image being similar to a specified image (hereinafter referred to as an "inquired image") is retrieved from an image database in which image data is accumulated and managed. Many conventional similar-image retrieving technologies of this kind have been proposed. In such conventional technologies, color information is mainly used as an image feature descriptor. Moreover, in most of the conventional technologies, a histogram of color information and a comparison process based on similarity obtained by the histogram is employed to retrieve a targeted image. However, this method has a problem in that a color structure of an image is not reflected.

To solve this problem, similar-image retrieval technologies are disclosed in, for example, Japanese Patent Application Laid-open Hei 8-249349 in which the image is retrieved with high accuracy by introducing an attempt to have the color structure of the image reflected in the image retrieval and where, in an image database, the image is divided into a plurality of blocks and then a typical color of each block is calculated as an image feature descriptor and a pattern matching is performed. However, in this conventional technology, since the typical color of each block is calculated, a scale of the image feature descriptor is made larger, causing a reduction in a retrieval speed. This also causes a size of a hardware required for retrieval processing to be made larger.

Another conventional method to solve this problem is to perform an orthogonal transform on the image to efficiently express the image feature. FIG. 4 is a schematic block diagram showing configurations of main parts of a conventional image retrieval device using a transform coefficient. As shown in FIG. 4, an image feature descriptor storing section 41 stores a transform coefficient 401 for various image data. A similarity calculating section 42 compares a transform coefficient 403 contained in inquired image data with an image feature descriptor 402 accumulated in the image feature descriptor storing section 41 to calculate similarity between them and outputs its result 404.

By performing an orthogonal transform of an image and by using a part of the coefficient as an image feature descriptor, a scale of the image feature descriptor can be made smaller. This allows the retrieval processing to be made high-speed and a size of a hardware to be made smaller.

Furthermore, another method to improve image retrieval accuracy is to decode a transform coefficient. FIG. 5 is a schematic block diagram showing configurations of another conventional image retrieval device which performs decoding of the transform coefficient. As shown in FIG. 5, the conventional image retrieval device is composed of an image feature descriptor storing section 51, an inverse orthogonal transforming device 52, a color space transforming device 53 and a similarity calculating section 54. The image feature descriptor storing section 51 stores, in advance, a transform coefficient 501 of image data as an image feature descriptor. The inverse orthogonal transforming device 52 performs an inverse orthogonal transform on an image descriptor 502 accumulated in the image feature descriptor storing section 51 and outputs transformed image data 503. The color space transforming device 53 transforms color space of image data 504 output from the inverse orthogonal transforming device 52. Inquired image data 505 is input as image data 506 whose color space is transformed by a color space transforming device 55 to the similarity calculating section 54. The similarity calculating section 54 calculates similarity between the input image data 506 and the image data 504 obtained from the color space transforming device 53 and outputs its result 507.

However, each of above conventional similarity image retrieving technologies has following problems:

In the conventional technology to try to express efficiently an image feature by performing an orthogonal transform on an image, though retrieval processing can be made high-speed and a size of a hardware required for image retrieval can be made smaller, the conventional technology cannot detect an image having a complete visual similarity or detects an image which is not visually similar in some cases.

This is because there is no conformity in a distance between images expressed by transform coefficients and visual similarity among images, causing insufficient retrieval accuracy In the conventional technology to match an image obtained by reconstructing the image by decoding orthogonally-transformed coefficient and then mapping the image over color space such as a HSV (Hue, Saturation, Value) or a like, with an inquired image, though excellent retrieval accuracy can be obtained, the image retrieval is very costly and speed of the image retrieval is reduced. This is because it is necessary to perform decoding processing and color space transforming processing, at every time of the retrieval, on each of image feature descriptors of accumulated data.

SUMMARY OF THE INVENTION

In view of the above, it is an object of the present invention to provide an image retrieval device, an image retrieval method and a storage medium storing similar-image retrieval program which are capable of simplify system configurations without incurring failure of image retrieval performance.

Also, it is another object of the present invention to provide an image retrieval device, an image retrieval method and a storage medium storing similar-image retrieval program which are capable of retrieving images at higher speed with simplified calculating processes.

According to a first aspect of the present invention, there is provided an image retrieval device for retrieving an image being similar to an inquired image from images stored in an image database including:

a first coefficient transforming means for transforming a first group of image feature descriptors extracted from image data accumulated in the image database and then generating a second group of image feature descriptors to be used for calculating similarity;

a second coefficient transforming means for transforming a first group of image feature descriptors extracted from image data of the inquired image and then generating a second group of image feature descriptors to be used for calculating similarity; and a similarity calculating means for calculating similarity by comparing the second group of image feature descriptors for each piece of image data generated by the first coefficient transforming means with the second group of image feature descriptors transformed by the second coefficient transforming means.

In the foregoing, a preferable mode is one that wherein includes an image feature descriptor storing means and wherein the similarity calculating means compares the second group of image feature descriptors of image data of the inquired image received from the second coefficient transforming means with the second group of image feature descriptors of image data contained in the image database read from the image feature descriptor storing means.

Also, a preferable mode is one wherein the first coefficient transforming means and the second coefficient transforming means perform transform of image feature descriptors in a manner that visual similarity between images to be compared is approximated by a distance between an image expressed by the second group of image feature descriptors of image data contained in the image database and an image expressed by the group of image feature descriptors of image data of the inquired image.

Also, a preferable mode is one wherein the first coefficient transforming means and the second coefficient transforming means use, as the image feature descriptor, a transform coefficient obtained by performing specified transforming processing of coefficient on image data.

Also, a preferable mode is one wherein the first coefficient transforming means and the second coefficient transforming means perform transform of the coefficient using a transform table selected depending on a kind of transform coefficient to be used as the image feature descriptor and wherein the first coefficient transforming means and the second coefficient transforming means perform retrieval of a similar-image on a trial basis using a plurality of the transform tables each having a differently segmented range of the transform coefficient and select a transform table which has showed a high rate of correctly solved retrieval in the retrieval on a trial basis.

Also, a preferable mode is one wherein the first coefficient transforming means and the second coefficient transforming means perform a transform of the coefficient in a manner that fine quantization is carried out on a range of a portion of each of the transform coefficients having a small amplitude and that coarse quantization is carried out on a range of a portion of each of the transform coefficients having a large amplitude.

Furthermore, a preferable mode is one wherein the first coefficient transforming means and the second coefficient transforming means perform transform of the coefficient in a manner that fine quantization is carried out on a coefficient having a small power and coarse quantization is carried out on a coefficient having a large power.

According to a second aspect of the present invention, there is provided an image retrieval device for retrieving an image being similar to an inquired image from images stored in an image database including:

a coefficient transforming means for transforming a first group of image feature descriptors extracted from image data accumulated in the image database and from image data of the inquired image and then generating a second group of image feature descriptors used to calculate similarity; and a similarity calculating means for comparing the second groups of image feature descriptors generated by the coefficient transforming means and then calculating similarity between an image accumulated in the image database and the inquired image.

According to a third aspect of the present invention, there is provided an image retrieving method for retrieving an image being similar to an inquired image from images stored in an image database, the method including:

a step of transforming a first group of image feature descriptors extracted from image data accumulated in the image database and then generating a second group of image feature descriptors to be used for calculating similarity;

a step of transforming a first group of image feature descriptors extracted from image data of the inquired image and then generating a second group of image feature descriptors to be used for calculating similarity; and a step of comparing the second group of image feature descriptors of image data accumulated in the image database with the second group of image feature descriptors of image data of the inquired image to calculate similarity.

In the foregoing, it is preferable that, in the two steps in which the first group of image feature descriptors is transformed and the second group of image feature descriptors is generated, a transform of the coefficient is performed using a transform table selected depending on a kind of transform coefficient to be used as the image feature descriptor and wherein retrieval of a similar-image is performed on a trial basis using a plurality of the transform tables each having a differently segmented range of the transform coefficient and a transform table is selected which has showed a high rate of correctly solved retrieval in the retrieval on a trial basis.

According to a fourth aspect of the present invention, there is provided a storage medium storing a similar-image retrieval program to cause a computer to carry out retrieval of an image being similar to an inquired image from images stored in an image database, wherein the similar-image retrieval program includes a step of transforming a first group of image feature descriptors extracted from image data accumulated in the image database and then generating a second group of image feature descriptors to be used for calculating similarity, a step of transforming a first group of image feature descriptors extracted from image data of the inquired image and then generating a second group of image feature descriptors to be used for calculating similarity; and a step of comparing the second group of image feature descriptors of image data accumulated in the image database with the second group of image feature descriptors of image data of the inquired image to calculate similarity.

In the foregoing, a preferable mode is one that wherein includes an image size transforming means for increasing or decreasing image data and/or inquired image data accumulated in the one wherein the image feature descriptor producing means performs a discrete cosine transform (DCT) on an image obtained by the image size transforming means and extracts an obtained DCT coefficient and uses the DCT coefficient as a first group of image feature descriptors.

Also, a preferable mode is one that wherein includes an image size transforming process of increasing or decreasing image data and/or inquired image data accumulated in the image database in size and an image feature descriptor producing process of performing an orthogonal transform on an image obtained by the image size transforming process and producing an orthogonal transform coefficient and using the orthogonal transform coefficient as a first group of image feature descriptor image database in size and an image feature descriptor producing means for performing an orthogonal transform on an image obtained by the image size transforming means and producing an orthogonal transform coefficient and using the orthogonal transform coefficient as a first group of image feature descriptors.

Also, a preferable mode is one wherein the image size transforming means has a block dividing means for diving the image data into blocks, a typical color calculating means for calculating a typical color of each of blocks obtained by the block dividing means and an image creating means for creating an image using the typical color of each of the blocks as a pixel.

Also, a preferable mode is one wherein the image creating means extracts a color average of entire pixels contained in each of the blocks as the calculated typical color of each of the blocks.

Also, a preferable mode is one wherein the block dividing means divides the image data into 64 blocks.

Also, a preferable mode is one wherein the image size transforming process has a block dividing process of diving the image data into blocks, a typical color calculating process of calculating a typical color of each of blocks obtained by the block dividing process and an image creating process of creating an image using the typical color of each of the blocks as a pixel.

Also, a preferable mode is one wherein the image creating process is to extract a color average of entire pixels contained in each of the blocks as the calculated typical color of each of the blocks.

Also, a preferable mode is one wherein the block dividing process is to divide the image data into 64 blocks. Furthermore, a preferable mode is one wherein the image feature descriptor producing process is to perform a DCT on an image obtained by the image size transforming process and to extract an obtained DCT coefficient and to use the DCT coefficient as a first group of image feature descriptors.

With the above configurations, since second image feature descriptors to be used for calculating similarity are computed by transforming first image feature descriptors extracted, in advance, from image data and then similarity is calculated by directly using the second image feature descriptors, decoding processing on image feature descriptors and pattern matching at a time of retrieval of a similar-image are not required. This allows retrieval processing to be performed with simplified calculating processes and configurations of the retrieval device to be made simple and compact.

Moreover, since the first image feature descriptor is transformed to the second image feature descriptor in a manner that visual similarity between images is approximated by a distance between images expressed by groups of the second image feature descriptors, retrieval performance can be successfully improved.

Therefore, it is possible that retrieving images successfully at higher speed with simplified configurations.

BRIEF DESCRIPTION OF THE DRAWINGS

The above and other objects, advantages and features of the present invention will be more apparent from the following description taken in conjunction with the accompanying drawings in which:

FIG. 3 is a table showing a comparison of a rate of correctly solved retrieval for same database and inquired image obtained by using a DCT (Discrete Cosine Transform) coefficient itself, a transformed DCT coefficient or image decoding according to the first embodiment of the present invention;

FIG. 4 is a schematic block diagram for showing configurations of main parts of a conventional image retrieval device using a transform coefficient; and FIG. 5 is a schematic block diagram for showing configurations of another conventional image retrieval device.

DETAILED DESCRIPTION OF THE PREFERRED EMBODIMENTS

Best modes of carrying out the present invention will be described in further detail using various embodiments with reference to the accompanying drawings.

First Embodiment

Figure 1:
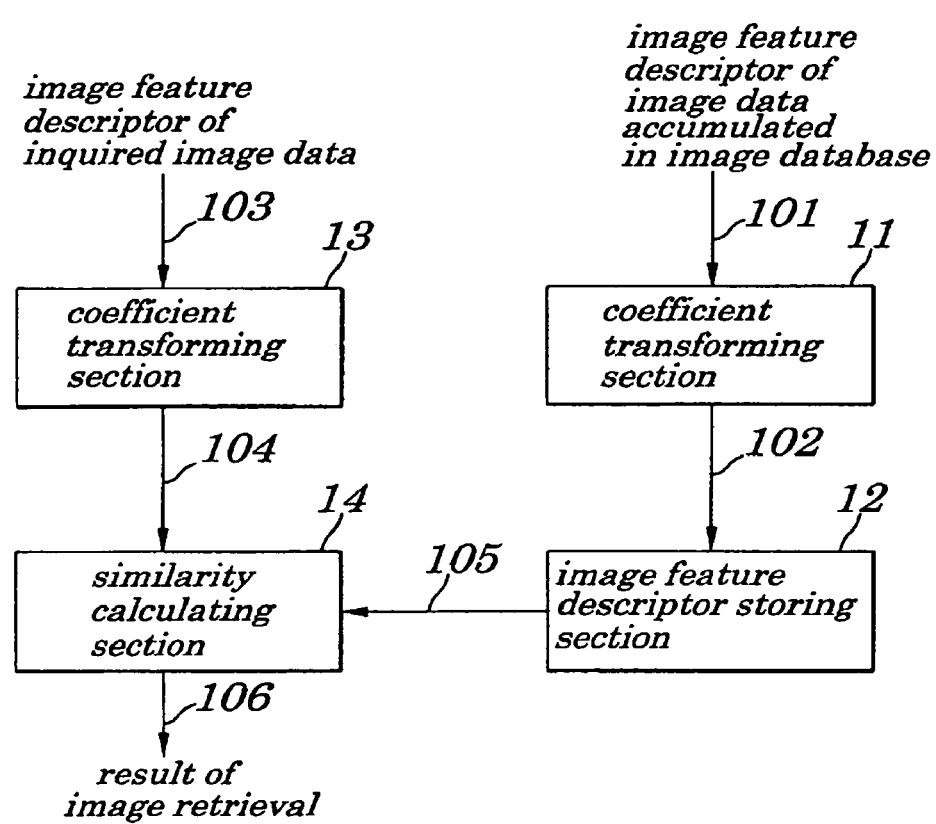
FIG. 1 is a schematic block diagram showing configurations of an image retrieval device according to a first embodiment of the present invention.

FIG. 1 is a schematic block diagram showing configurations of an image retrieval device according to a first embodiment of the present invention. As shown in FIG. 1, the image retrieval device of the first embodiment is composed of coefficient transforming sections 11 and 13 to transform an image feature descriptor, an image feature descriptor storing section 12 to accumulate an image feature descriptor of image data transformed by the coefficient transforming section 11 and a similarity calculating section 14 to compare the image feature descriptor of inquired image data transformed by the coefficient transforming section 13 with image feature descriptor of image data accumulated by the image feature descriptor storing section 12 to calculate similarity between them.

The coefficient transforming sections 11 and 13 and the similarity calculating section 14 can be implemented by program-controlled CPUs (Central Processing Units), RAMs (Random Access Memories) and other internal memories in, for example, a personal computer, workstation and other computer systems. The image feature descriptor storing section 12 can be implemented by, for example, magnetic disks and other external storage devices. By storing image data in external storage devices, by fetching image feature descriptors of an image used to be compared with an inquired image to calculate similarity at every time of retrieving a similar-image and by performing transform processing, the image feature descriptor storing section 12 can be implemented by internal memories. Computer programs to implement functions of the coefficient transforming sections 11 and 13 and the similarity calculating section 14 can be stored in magnetic disks, optical disks, semiconductor memories and other general storage media.

The coefficient transforming sections 11 and 13 converts each factor of a first group of image feature descriptors extracted from image data to each factor of a second group of image feature descriptors to be used for calculation of similarity to be performed by the similarity calculating section 14. In this embodiment, a transform coefficient is used as the image feature descriptor. The transform coefficient represents a coefficient calculated by performing a Discrete Cosine Transform (DCT), wavelet transform, Hadamard Transform or a like on image data. A transform can be achieved by applying an individual transform method to each of coefficients of image feature descriptors or by applying a common transform method to two or more coefficients.

Moreover, as described above, the coefficient transforming section 11 extracts a first image feature descriptor 101 from image data accumulated in the image database and converts and then stores a second image feature descriptor 102 obtained by the transformation in the image feature descriptor storing section 12. The coefficient transforming section 13 extracts a first image feature descriptor 103 from image data of inquired image and converts and feeds a second image feature descriptor 104 obtained by the transformation to the similarity calculating section 14.

The coefficient transforming sections 11 and 13 perform a transform of the coefficient in a manner that visual similarity among images is approximated by a distance between images expressed by each of the second image feature descriptors 102, 104. That is, the transform of the coefficient is performed so that the distance between images expressed by each of the second image feature descriptors 102, 104 in both images is made smaller in an image having visual similarity and the distance between images expressed by each of the second image feature descriptors 102, 104 in both images is made larger in an image having no visual similarity There is no limitation to a type of the transform method so long as such a result as above is obtained. One example of it is a method using a transform table. The method using the transform table will be described in detail later.

Moreover, in the first embodiment, though the coefficient transforming section 11 to transform the first image feature descriptor 101 stored in an image database to the second image feature descriptor 102 and the coefficient transforming section 13 to transform the first image feature descriptor 103 extracted from image data of an inquired image are separately disposed, in an actual device, these two coefficient transforming sections 11 and 13 may be implemented as a same processing unit which may be configured in a manner that the unit judges whether input data is image data contained in an image database or the input data is image data contained in an inquired image and decides a place to which a produced second image feature descriptor 102,104 is transferred to.

The image feature descriptor storing section 12 stores the second image feature descriptor 102 of image data stored in an image database which has been transformed by the coefficient transforming section 11. The image feature descriptor storing section 12, in response to a request from the similarity calculating section 14, sends a second image feature descriptor 105 to the similarity calculating section 14.

The similarity calculating section 14 compares a second image feature descriptors 104 of an inquired image received from the coefficient transforming section 13 with the second image feature descriptor 105 received from the image feature descriptor storing section 12 to calculate similarity between them. That is, a distance between images expressed by each of the two second image feature descriptors 104, 105 is calculated. An image having high similarity, that is, the image having a distance being near to an image expressed in the second image feature descriptor 104 obtained from the inquired image, out of images expressed by the second image feature descriptor 105, is selected and the image contained in an image database corresponding to the second image feature descriptor 105 is detected as an image 106 being similar to the inquired image. Moreover, similarity and non-similarity between images can be determined by setting an appropriate threshold and by judging whether a distance between images expressed by the two second image feature descriptors 104 and 105 is larger or smaller than the threshold.

The similarity calculating section 14, as described above, calculates similarity using the second image feature descriptor 104 obtained by the inquired image and the second image feature descriptor 104 stored in the image feature descriptor storing section 12. Therefore, when a similar-image is retrieved, decoding processing of the second image feature descriptor 104 is not required. This enables configurations of the retrieval device to be simplified. Moreover, since the second image feature descriptor 104 stored in advance is directly used to calculate similarity, retrieval processing can be performed by simple calculating processes.

Figure 2:
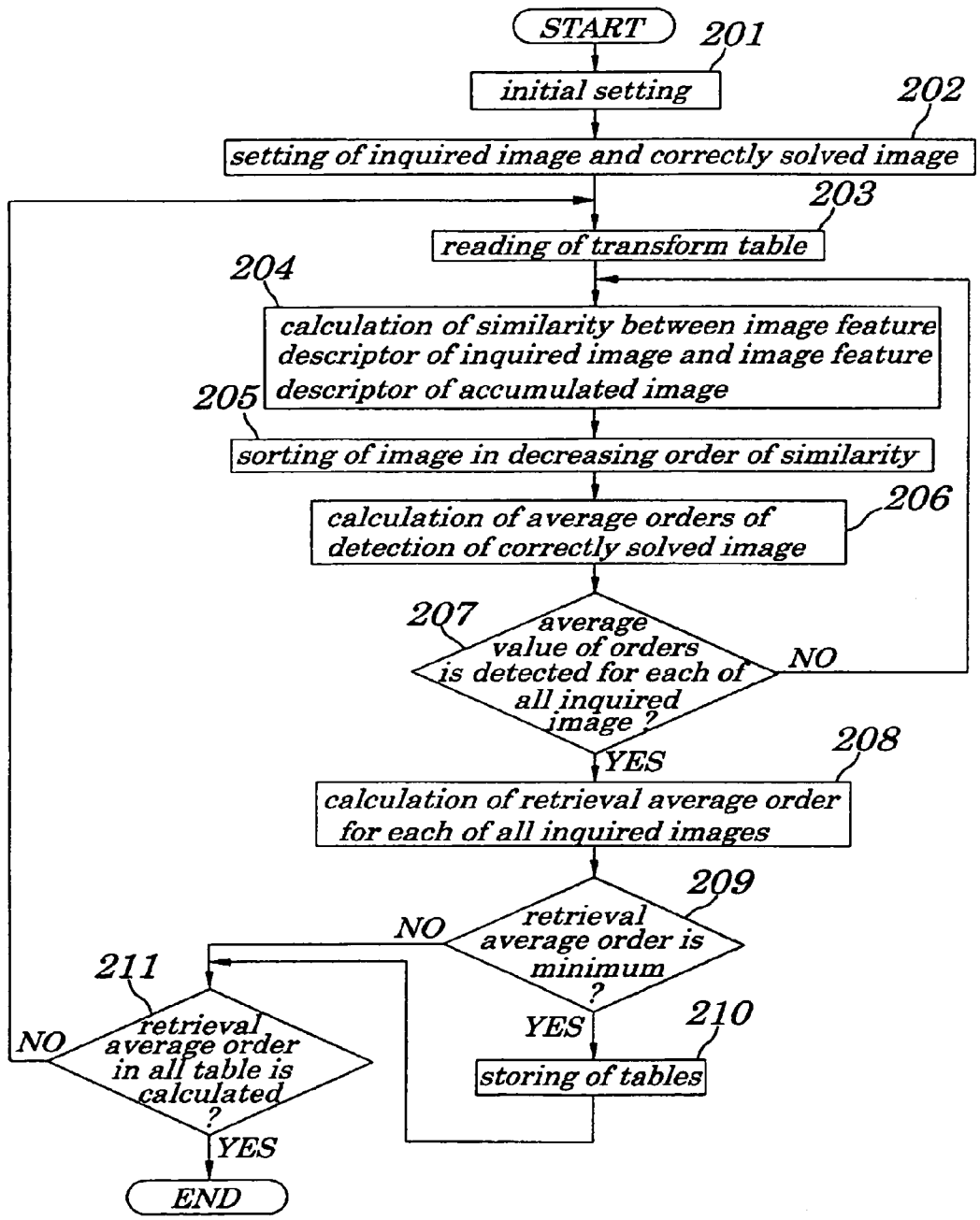
FIG. 2 is a flowchart explaining selecting procedures in a transform table used in the image retrieval device according to the first embodiment of the present invention.

Next, the method in which a transform table used for a process of transforming an image feature descriptor in the coefficient transforming sections 11 and 13 is selected will be described below. FIG. 2 is a flowchart explaining a selecting procedure in the transform table used in the image retrieval device according to the first embodiment. As shown in FIG. 2, image data and a transform coefficient corresponding to the image data is first prepared for initial setting. A transform table corresponding to the transform coefficient is prepared (Step 201).

As described above, various transform methods to provide transform coefficients may be used, which allows a variety of transform tables to be selected. It is necessary to prepare a transform table in which a coefficient is transformed in a manner that a range of a portion of each of transform coefficients having a small amplitude is finely segmented and a value is assigned to each of the segmented ranges, that is, the range of each of the transform coefficients is quantized and in a manner that a range of a portion of each of transform coefficients having a large amplitude is coarsely segmented and a value is assigned to each of the segmented ranges, that is, a range of each of the transform coefficients is quantized. Furthermore, it is necessary to prepare a transform table in which a coefficient is transformed in a manner that a range of each of two or more coefficients having a small power is finely segmented and a value is assigned to each of the segmented ranges, that is, the range of each of the two or more coefficients is finely quantized and in a manner that a range of each of two or more coefficients having a large power is coarsely segmented and a value is assigned to each of the segmented ranges. Therefore, a plurality of tables each having a slightly different range to be segmented is prepared. Either of a transform table in which a coefficient is transformed based on an individual standard for each coefficient or a transform table in which two or more coefficients are transformed based on a same standard can be used.

Next, an inquired image and an image being visually similar to the inquired image which has been accumulated in image database are set (Step 202). In application, an image being visually similar to the inquired image is called a "correctly solved image". In order to improve retrieval accuracy, a plurality of inquired images and correctly solved images which can correspond to each of the inquired images are set and following processing is performed on each of the correctly solved images. Moreover, a judgement as to which image is visually similar to the inquired image depends on a subjective judgement of an operator.

Next, the coefficient transforming sections 11 and 13 read the prepared transform table and calculate a transform coefficient of image data and then perform a coefficient transform using the read transform table (Step 203). The coefficient transforming section 11 calculates a transform coefficient for each of image data accumulated in image database and performs a transform using the calculated transform coefficient. The coefficient transforming section 13 calculates a transform coefficient of image data of the inquired image to perform a transform. The coefficient transformed by the coefficient transforming section 11 is stored in the image feature descriptor storing section 12. The similarity calculating section 14 compares a coefficient (second image feature descriptor) obtained by transforming an inquired image with a coefficient (second image feature descriptor) obtained by transforming stored in the image feature descriptor storing section 12 to calculate similarity (Step 204). Then, each of images stored in the image database is sorted in decreasing order of similarity (Step 205) and an average value of orders in which a correctly solved image is detected (Step 206).

An average value of orders in which a correctly solved image is detected by performing procedures Step 204 to Step 206 for each of all inquired images is calculated (Step 207) and then an average value of calculated average orders (hereinafter referred to as "retrieval average orders") in which a correctly solved image for each of all inquired images is calculated (Step 208).

Next, the retrieval average orders calculated at Step 208 and transform tables are registered on the coefficient transforming sections 11 and 13 When other transform tables and retrieval average orders have been already registered, a retrieval average order newly obtained is compared with the retrieval average orders already registered. If the retrieval average order newly obtained is larger than the retrieval average order already registered, the registered transform table and retrieval average order are maintained as they are. If the retrieval average order newly obtained is smaller than the retrieval average order already registered, the registered transform table and retrieval average order are replaced with a new transform table and a retrieval average order (Steps 209 and 210).

Same processing as above is sequentially performed on the two or more prepared transform tables and a retrieval average order is obtained in the transform table. The transform table having a small retrieval average order and retrieval average order remain left. When the calculation of the retrieval average order in all the prepared tables is terminated, a stored table, that is, a transform table from which a minimum retrieval average order is obtained is output as an optimum transform table and the processing is terminated (Step 211).

Moreover, though, in the above embodiment, an average value of orders in which a correctly solved image is retrieved is used as an evaluation value, a transform table in which an average value of similarity obtained when a correctly solved image is retrieved is used as an evaluation value and in which a sum of the average value of similarity to an inquired image is maximized, maybe used.

Next, results from actual retrieval of a similar-image are shown below. First, by carrying out an experiment using an image database including 2,045 pieces of images, a coefficient transform table is created. Then, images (correctly solved images) evaluated, based on a subjective evaluation of the operator, to be similar to 26 pieces of inquired images are selected in advance. A value obtained by adding, with weights assigned, squared errors of each of transformed coefficients is employed as a distance between images and the distance is sorted in increasing order of distance and an average of orders in which a correctly solved image is retrieved (retrieval average order) is used as an evaluation value. Then, an evaluation is performed by using a plurality of transformed coefficient tables and weighted coefficients and a transform coefficient table in which the retrieval average order is lowest is calculated.

Image feature descriptors were generated by the following methods. First, a still image is divided into 8×8 blocks and an average color of each block is calculated and a resized image having a fixed size (8 pixels×8 pixels) is generated. Then, a DCT transform is performed on the resized image and a seta of low-degree coefficients expressing luminance and a chrominance signal, out of obtained coefficients, is extracted. Furthermore, the obtained DCT coefficients are transformed by using a transform table and the transformed coefficients are used as image feature descriptors.

By using an image database containing 5,466 pieces of images and a most suitable transform table calculated on the above conditions, an experiment of retrieval of similar-images was carried out.

Images each being evaluated, from a subjective viewpoint, to be similar to each of 50 types of inquired images, are selected in advance and the selected images are defined to be correctly solved images. Sums of weighted squared difference between image feature descriptors of images contained in inquired images and in database are sorted in decreasing order of difference and the number of correctly solved images ranked within the n-th position of high orders are evaluated to be a rate of correctly solved retrieval. The rate of correctly solved retrieval is defined to be a quotient obtained by dividing all the number of correctly solved images by the number of correctly solved images ranked within the n-th position of high orders and the "n" is defined to be a value being four times larger than the number of correctly solved images selected in advance.

FIG. 3 is a table showing a comparison of the rate of correctly solved retrieval for same database and inquired image obtained by using the conventional technology in which a similar-image is retrieved by a DCT coefficient itself, by using this embodiment of the present invention in which a similar-image is retrieved by a transformed DCT coefficient or by using the conventional technology in which a similar-image is retrieved by decoding after the DCT transform and performing pattern matching. As is apparent from FIG. 3, by using the present embodiment in which the transform table is introduced, the rate of correctly solved retrieval is greatly improved. An almost same performance as obtained by decoding an 8×8 image and performing pattern matching can be achieved by using a far less number of coefficients.

It is apparent that the present invention is not limited to the above embodiments but may be changed and modified without departing from the scope and spirit of the invention.

What is claimed is:

1. An image retrieval device for retrieving an image being similar to an inquired image from images stored in an image database comprising:

a first coefficient transforming means for transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database;

a second coefficient transforming means for transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image; and a similarity calculating means for calculating similarity by comparing said second group of image feature descriptors for each piece of image data generated by said first coefficient transforming means with said second group of image feature descriptors transformed by said second coefficient transforming means, wherein said first coefficient transforming means and said second coefficient transforming means perform coefficient transforms using a transform table selected depending on a kind of transform coefficient to be used as said image feature descriptor and wherein said first coefficient transforming means and said second coefficient transforming means perform retrieval of a similar image on a trial basis using a plurality of said transform tables each having a differently segmented range of said transform coefficient and select a transform table which has showed a high rate of correctly solved retrieval in said trial basis retrieval.

2. The image retrieval device according to claim 1, further comprising an image feature descriptor storing means and wherein said similarity calculating means compares said second group of image feature descriptors of image data of said inquired image received from said second coefficient transforming means with said second group of image feature descriptors of image data contained in said image database read from said image feature descriptor storing means.

3. The image retrieval device according to claim 1, wherein said first coefficient transforming means and said second coefficient transforming means transform image feature descriptors so that visual similarity between images to be compared is approximated by a distance between an image expressed by said second group of image feature descriptors of image data contained in said image database and an image expressed by said second group of image feature descriptors of image data of said inquired image.

4. An image retrieval device for retrieving an image being similar to an inquired image from images stored in an image database comprising:
    a first coefficient transforming means for transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database;
    a second coefficient transforming means for transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image; and
    a similarity calculating means for calculating similarity by comparing said second group of image feature descriptors for each piece of image data generated by said first coefficient transforming means with said second group of image feature descriptors transformed by said second coefficient transforming means, wherein said first coefficient transforming means and said second coefficient transforming means perform coefficient transforms in a manner that fine quantization is carried out on a range of a portion of each of said transform coefficients having a small amplitude and that coarse quantization is carried out on a range of a portion of each of said transform coefficients having a large amplitude.

5. The image retrieval device according to claim 4, wherein said first coefficient transforming means and said second coefficient transforming means perform coefficient transforms in a manner that fine quantization is carried out on said coefficient having a small power and coarse quantization is carried out on said coefficient having a large power.

6. An image retrieval device for retrieving an image being similar to an inquired image from images stored in an image database comprising:
    a first coefficient transforming means for transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database;
    a second coefficient transforming means for transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image; and
    a similarity calculating means for calculating similarity by comparing said second group of image feature descriptors for each piece of image data generated by said first coefficient transforming means with said second group of image feature descriptors transformed by said second coefficient transforming means, wherein said first coefficient transforming means and said second coefficient transforming means perform coefficient transforms in a manner that fine quantization is carried out on said transform coefficients having a small power and coarse quantization is carried out on said transform coefficients having a large power.

7. An image retrieving method for retrieving an image being similar to an inquired image from images stored in an image database, said method comprising:
    transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database;
    transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image; and
    comparing said second group of image feature descriptors of image data accumulated in said image database with said second group of image feature descriptors of image data of said inquired image to calculate similarity, wherein said specified transform processing is performed using a transform table selected depending on a kind of transform coefficient to be used as said image feature descriptor and wherein retrieval of a similar image is performed on a trial basis using a plurality of said transform tables each having a differently segmented range of said transform coefficient and a transform table is selected which has showed a high rate of correctly solved retrieval in said trial basis retrieval.

8. An image retrieval device for retrieving an image being similar to an inquired image from images stored in an image database comprising:

a first coefficient transforming means for transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database;

a second coefficient transforming means for transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image;

a similarity calculating means for calculating similarity by comparing said second group of image feature descriptors for each piece of image data generated by said first coefficient transforming means with said second group of image feature descriptors transformed by said second coefficient transforming means, wherein said first coefficient transforming means and said second coefficient transforming means perform coefficient transforms in a manner that fine quantization is carried out on said transform coefficients having a small power and coarse quantization is carried out on said transform coefficients having a large power;

an image size resizing means for resizing image data accumulated in said image database and/or inquired image; and an image feature descriptor producing means for performing an orthogonal transform on an image obtained by said image size resizing means and producing an orthogonal transform coefficient and using said orthogonal transform coefficient as a first group of image feature descriptors, wherein said image size resizing means comprising a block dividing means for partitioning said image data into blocks, a dominant color calculating means for calculating a dominant color of each of blocks obtained by said block dividing means and an image creating means for creating an image using said dominant color of each of said blocks as a pixel.

9. The image retrieval device according to claim 8, wherein said image creating means extracts a color average of entire pixels contained in each of said blocks as said calculated dominant color of each of said blocks.

10. The image retrieval device according to claim 8, wherein said block dividing means partitions said image into 64 blocks.

11. An image retrieval device for retrieving an image being similar to an inquired image from images stored in an image database comprising:

a first coefficient transforming means for transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database;

a second coefficient transforming means for transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image;

an image size resizing means for resizing image data accumulated in said image database and/or inquired image, wherein said image size resizing means comprises a block dividing means for partitioning said image data into blocks, a dominant color calculating means for calculating a dominant color of each of blocks obtained by said block dividing means and an image creating means for creating an image using said dominant color of each of said blocks as a pixel;

an image feature descriptor producing means for performing a discrete cosine transform on an image obtained by said image size resizing means to produce a discrete cosine transform coefficient for use as an extracted first group of image feature descriptors; and a similarity calculating means for calculating similarity by comparing said second group of image feature descriptors generated by said first coefficient transforming means with said second group of image feature descriptors generated by said second coefficient transforming means, wherein said first coefficient transforming means and said second coefficient transforming means perform coefficient transforms in a manner that fine quantization is carried out on said transform coefficients having a small power and coarse quantization is carried out on said transform coefficients having a large power.

12. An image retrieval device for retrieving an image being similar to an inquired image from images stored in an image database comprising:

a coefficient transforming means for transforming first groups of image feature descriptors extracted from image data accumulated in said image database and from image data of said inquired image and then generating second groups of image feature descriptors used to calculate similarity, wherein said second groups of image feature descriptors comprise transform coefficients obtained by performing specified coefficient transform processing on said image data accumulated in said image database and on said inquired image;

a similarity calculating means for comparing said second groups of image feature descriptors generated by said coefficient transforming means, wherein said coefficient transforming means performs coefficient transforms in a manner that fine quantization is carried out on said transform coefficients having a small power and coarse quantization is carried out on said transform coefficients having a large power and then calculating similarity between an image accumulated in said image database and said inquired image;

an image size resizing means for resizing image data accumulated in said image database and/or inquired image; and an image feature descriptor producing means for performing an orthogonal transform on an image obtained by said image size resizing means and producing an orthogonal transform coefficient and using said orthogonal transform coefficient as a first group of image feature descriptors, wherein said image size resizing means comprises a block dividing means for partitioning said image data into blocks, a dominant color calculating means for calculating a dominant color of each of blocks obtained by said block dividing means and an image creating means for creating an image using said dominant color of each of said blocks as a pixel.

13. The image retrieval device according to claim 12, wherein said image creating means extracts a color average of entire pixels contained in each of said blocks as said calculated dominant color of each of said blocks.

14. The image retrieval device according to claim 12, wherein said block dividing means partitions said image into 64 blocks.

15. An image retrieval device for retrieving an image being similar to an inquired image from images stored in an image database comprising:

a coefficient transforming means for transforming a first group of image feature descriptors extracted from image data accumulated in said image database and then generating a second group of image feature descriptors used for calculating similarity, wherein said second group of image feature descriptors comprise transform coefficients obtained by performing specified coefficient transform processing on said image data accumulated in said image database, and for transforming a first group of image feature descriptors extracted from image data of said inquired image and then generating a second group of image feature descriptors used to calculate similarity, wherein said second group of image feature descriptors comprise transform coefficients obtained by performing specified coefficient transform processing on said inquired image, wherein said coefficient transforming means comprises an image size resizing means for resizing image data accumulated in said image database and/or inquired image, wherein said image size resizing means comprises a block dividing means for partitioning said image data into blocks, a dominant color calculating means for calculating a dominant color of each of blocks obtained by said block dividing means and an image creating means for creating an image using said dominant color of each of said blocks as a pixel, and an image feature descriptor producing means for performing a discrete cosine transform on an image obtained by said image size resizing means to produce a discrete cosine transform coefficient for use as an extracted first group of image feature descriptors; and a similarity calculating means for comparing said generated second group of image feature descriptors of said image data accumulated in said image database with said generated second group of image feature descriptors of said inquired image, wherein said coefficient transforming means performs coefficient transforms in a manner that fine quantization is carried out on said transform coefficients having a small power and coarse quantization is carried out on said transform coefficients having a large power.

16. An image retrieving method for retrieving an image being similar to an inquired image from images stored in an image database, said method comprising:

transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database;

transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image;

comparing said second group of image feature descriptors of image data accumulated in said image database with said second group of image feature descriptors of image data of said inquired image to calculate similarity, wherein said specified coefficient transform processing is performed in a manner that fine quantization is carried out on said transform coefficients having a small power and coarse quantization is carried out on said transform coefficients having a large power;

resizing image data accumulated in said image database and/or inquired image in size; and producing an image feature descriptor by performing an orthogonal transform on an image obtained by said image size resizing and producing an orthogonal transform coefficient and using said orthogonal transform coefficient as a first group of image feature descriptors, wherein said image size resizing comprises a block dividing process of partitioning said image data into blocks, a dominant color calculating process of calculating a dominant color of each of blocks obtained by said block dividing process and an image creating process of creating an image using said dominant color of each of said blocks as a pixel.

17. The image retrieval method according to claim 16, wherein said image creating process is to extract a color average of entire pixels contained in each of said blocks as said calculated dominant color of each of said blocks.

18. The image retrieval method according to claim 16, wherein said block dividing process is to partition said image data into 64 blocks.

19. An image retrieving method for retrieving an image being similar to an inquired image from images stored in an image database, said method comprising:

transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database;

transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image;

resizing image data accumulated in said image database and/or inquired image in size, wherein image size resizing comprises a block dividing process of partitioning said image data into blocks, a dominant color calculating process of calculating a dominant color of each of blocks obtained by said block dividing process and an image creating process of creating an image using said dominant color of each of said blocks as a pixel;

producing an image feature descriptor by performing a discrete cosine transform on an image obtained by said image size resizing, and using the produced discrete cosine transform coefficient as an extracted first group of image feature descriptors; and comparing said second group of image feature descriptors of image data accumulated in said image database with said second group of image feature descriptors of image data of said inquired image to calculate similarity, wherein said specified coefficient transform processing is performed in a manner that fine quantization is carried out on said transform coefficients having a small power and coarse quantization is carried out on said transform coefficients having a large power.

20. A storage medium storing a similar-image retrieval program to cause a computer to carry out retrieval of an image being similar to an inquired image from images stored in an image database, wherein said similar-image retrieval program causes the computer to execute the steps of:

transforming a first group of image feature descriptors extracted from image data accumulated in said image database and then generating a second group of image feature descriptors to be used for calculating similarity, wherein said second group of image feature descriptors comprise transform coefficients obtained by performing specified coefficient transform processing on said image data accumulated in said image database, transforming a first group of image feature descriptors extracted from image data of said inquired image and then generating a second group of image feature descriptors to be used for calculating similarity, wherein said second group of image feature descriptors comprise transform coefficients obtained by performing specified coefficient transform processing on said inquired image;

comparing said second group of image feature descriptors of image data accumulated in said image database with said second group of image feature descriptors of image data of said inquired image to calculate similarity, wherein said specified transform processing is performed in a manner that fine quantization is carried out on said transform coefficients having a small power and coarse quantization is carried out on said transform coefficients having a large power;

resizing image data accumulated in said image database and/or inquired image; and producing an image feature descriptor by performing an orthogonal transform on an image obtained by said image size process and producing an orthogonal transform coefficient and using said orthogonal transform coefficient as a first group of image feature descriptors, wherein said image size resizing comprises a block dividing process of partitioning said image data into blocks, a dominant color calculating process of calculating a dominant color of each of blocks obtained by said block dividing process and an image creating process of creating an image using said dominant color of each of said blocks as a pixel.

* * * * *